(12) United States Patent
Poguntke et al.

(10) Patent No.: US 6,628,197 B1
(45) Date of Patent: Sep. 30, 2003

(54) DEVICE FOR BRAKE LIGHT CONTROL

(75) Inventors: Oliver Poguntke, Munich (DE); Willibald Prestl, Eichenau (DE); Thomas Toelge, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/563,529

(22) Filed: May 3, 2000

(30) Foreign Application Priority Data

May 3, 1999 (DE) .......................................... 199 20 096

(51) Int. Cl.⁷ .............................................. B60Q 1/44
(52) U.S. Cl. .................. 340/479; 340/463; 340/467; 340/468
(58) Field of Search ................ 340/479, 467, 340/463, 464, 468, 471, 472

(56) References Cited

U.S. PATENT DOCUMENTS

| 3,847,243 A | * | 11/1974 | Barth ........................ 180/79.2 |
| 4,978,177 A | * | 12/1990 | Ingraham et al. ............... 303/3 |
| 5,017,904 A | * | 5/1991 | Browne et al. ............. 340/479 |
| 5,148,147 A | * | 9/1992 | Kobres ........................ 340/464 |
| 5,150,098 A | * | 9/1992 | Rakow ........................ 340/479 |
| 5,231,373 A | * | 7/1993 | Freeman et al. ............ 340/469 |
| 5,390,987 A | * | 2/1995 | Will et al. ................. 303/9.62 |
| 5,426,418 A | * | 6/1995 | Furgeson et al. ........... 340/479 |
| 5,481,243 A | * | 1/1996 | Lurie et al. ................. 340/467 |
| 5,504,472 A | * | 4/1996 | Wilson ........................ 340/479 |
| 5,589,817 A | * | 12/1996 | Furness ....................... 340/467 |
| 5,606,310 A | * | 2/1997 | Egger et al. ................ 340/479 |
| 5,786,752 A | * | 7/1998 | Bucalo et al. .............. 340/467 |
| 5,794,735 A | * | 8/1998 | Sigl ............................ 180/170 |
| 5,801,624 A | * | 9/1998 | Tilly et al. .................. 340/479 |
| 5,842,774 A | * | 12/1998 | Sur ............................. 340/479 |
| 5,850,177 A | * | 12/1998 | Zimmerman ................ 340/479 |
| 6,020,814 A | * | 2/2000 | Robert ........................ 340/467 |
| 6,137,401 A | * | 10/2000 | Barrows ...................... 340/479 |
| 6,147,600 A | * | 11/2000 | Faye ........................... 340/467 |
| 6,150,933 A | * | 11/2000 | Matsumoto ................. 340/479 |
| 6,160,476 A | * | 12/2000 | Ponziani ..................... 340/479 |

FOREIGN PATENT DOCUMENTS

DE                31 30 873          3/1982

* cited by examiner

*Primary Examiner*—Nina Tong
(74) *Attorney, Agent, or Firm*—Crowell & Moring LLP

(57) ABSTRACT

A device is provided for controlling brake lights in a vehicle. The vehicle has a braking system designed for outside force actuation, a control device for controlling the vehicle brakes, and a brake light switch located in the vicinity of a brake pedal, which is connected with a control device for controlling at least one brake light. In order to indicate to following traffic a brake application by active braking intervention in a vehicle, the control unit is connected with the control device and operates the latter such that the brake light, even without actuation of the brake light switch, is activatable under first specified vehicle operating conditions and is deactivatable under second specified vehicle operating conditions.

22 Claims, 2 Drawing Sheets

DEVICE FOR BRAKE LIGHT CONTROL

BACKGROUND AND SUMMARY OF THE INVENTION

This application claims the priority of German Application No. 199 20 096.3, filed May 3, 1999, the disclosure of which is expressly incorporated by reference herein.

The invention relates to a device for controlling brake lights in a vehicle with a brake system designed for outside force actuation. A control unit controls the vehicle brakes and a brake light switch located in the vicinity of a brake pedal. The switch is connected with a control device to control at least one brake light.

In motor vehicles, brake light switches are usually installed in the vicinity of the brake pedal and are activated when a brake pedal is operated. The brake light switch then operates the brake lights directly or through a control device located in between, to indicate to following traffic that a leading vehicle is being braked.

The use of brake-regulating systems poses problems in this regard, especially use of vehicle speed-regulating systems that perform active braking intervention without a brake pedal being operated by a vehicle owner. Without suitable measures, the brake light cannot be controlled during such braking intervention. Consequently, the application of the brake is not indicated to following traffic.

To avoid this problem, a system is known which operates the brake pedal itself during a braking intervention. In this known system, in the event of a brake application by a vehicle spacing regulating device, a vacuum braking force amplifier is controlled electrically. This then pulls the brake pedal forward so that the conventional brake light switch is actuated in its normal fashion.

This procedure however means that in the event of a braking intervention by the driver, the brake pedal is not in its usual position. This may require some getting used to and may irritate the driver.

In addition to the system described above in which the brake pedal is pulled forward, an application is also possible in which, during an active braking intervention, especially a spacing regulating intervention, an active braking regulating system is operated by a hydraulic assembly without the brake pedal moving. The brake light switch is not actuated, however.

The goal of the present invention is to provide a device which avoids this disadvantage. In particular, a brake light must be controlled so that it appears plausible to following traffic.

This goal is achieved by a device for brake light control in a vehicle with a brake system designed for outside force actuation. A control unit controls the vehicle brakes and a brake light switch located in the vicinity of a brake pedal. The switch is connected with a control device to control at least one brake light. The control unit is coupled with the control device and operates the latter so that the at least one brake light, even without operation of the brake light switch, can be activated under first defined vehicle operation conditions and is deactivatable under second defined vehicle operating conditions.

In particular, a control unit that serves to control vehicle brakes is connected with a control device that serves to control the brake lights. The control device is actuated by the control unit so that the brake lights can be activated even without operating the brake light switch under first defined vehicle operating conditions and can be deactivated under second defined vehicle operating conditions.

In the brake system, a conventional hydraulic system with a hydraulic assembly may be used. The hydraulic system is actuated by the control unit for regulating the braking pressures on the individual vehicle brakes. Of course, the present invention can also be used on all other brake systems actuated by outside forces. Thus, the brake system can be equipped with electromechanical vehicle brakes that are actuated directly and individually by a suitably designed control unit. The operating conditions must be chosen so that a brake application displayed to following traffic appears plausible.

According to a preferred embodiment of the invention, conditions are specified as criteria in which, for example, an active pressure increase by the hydraulic assembly takes place. This means that the hydraulic assembly is activated for a controlling brake application. In addition, the vehicle actual deceleration must exceed a certain threshold value, in other words deceleration must be present to a sufficient extent. Further, the hydraulic pressure developed in the hydraulic assembly must be higher than a certain threshold value, 2 bars for example.

Deactivation of the brake lights can be undertaken when: (1) the pressure development by the hydraulic assembly is terminated, (2) the vehicle actual deceleration falls below a certain threshold, in other words the deceleration is below a certain boundary deceleration, or (3) the hydraulic pressure in the brake system falls below a certain value. The two boundary deceleration values for activation of the brake light and for deactivation of the brake light can differ by an offset so that a control hysteresis is formed that avoids a tendency of the brake light to flicker.

According to another preferred embodiment of the invention, a device for determining the vehicle's actual deceleration is provided. A corresponding vehicle actual deceleration value is provided to the control unit so that one of the above criteria can be checked. In a simple embodiment, at least one wheel rpm sensor is provided to determine the actual deceleration of the vehicle.

It is also logical to provide a device for determining the hydraulic pressure in a hydraulic brake system between the hydraulic assembly and the wheel brakes so that the criterion of exceeding a pressure threshold value can be checked. According to a first embodiment, this device can be provided in the form of a calculating unit which estimates the hydraulic pressure, for example from the control times of valves installed in the hydraulic assemblies and a feedback pump. The estimate is generally conducted according to a certain model.

If pressure sensors are located between the hydraulic assembly and the wheel brakes, the hydraulic pressure can also be detected directly as an alternative.

To consider the grade of the road, the first vehicle deceleration boundary value increases with the brake lights being activated as a criterion, preferably with increasing hydraulic pressure. In particular, this increase is linear. In a graph representing hydraulic pressure as a function of actual deceleration, the first vehicle deceleration boundary value intersects the ordinate, in other words the axis for actual deceleration at a specified pressure of 0 bar at a value that is composed of a speed-dependent deceleration and a fixed offset value. The abscissa is intersected at one point by the vehicle deceleration boundary value at a deceleration of 0 m/sec$^2$ at which a downhill driving force compensates for a certain slope. A slope of 10% is assumed to be the slope for example. The reason for this will be explained later.

DETAILED DESCRIPTION OF THE DRAWINGS

Although the preferred embodiment shows the invention in a hydraulic braking system, the type of braking system does not limit the scope of protection.

Figure 1:
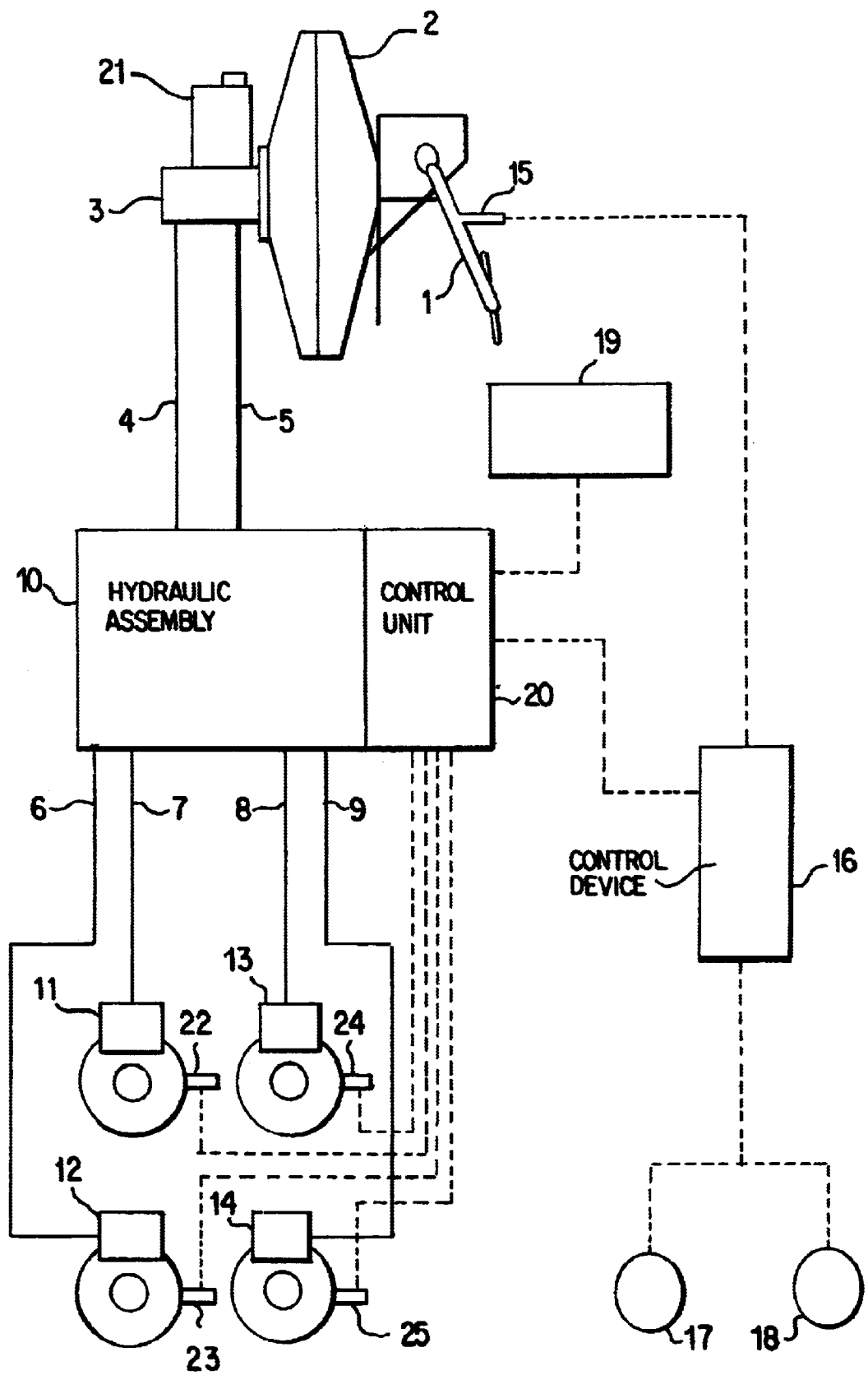
FIG. 1. is a block diagram schematic representation of a device according to the invention for controlling a brake light in a vehicle.

The schematic circuit diagram in FIG. 1 shows a brake pedal 1 by which a driver (not shown) exerts a force reinforced by a braking force amplifier 2 on a tandem main brake cylinder 3. By actuating brake pedal 1, a hydraulic pressure is produced in the tandem main brake cylinder 3. This pressure is transmitted through brake lines 4 and 5 to a hydraulic assembly 10. From hydraulic assembly 10, the braking force is transmitted through brake lines 6, 7, 8, and 9 to wheel brakes 11, 12, 13, and 14.

Hydraulic assembly 10 can be a conventionally known hydraulic assembly for brake application operated by outside forces as is generally employed in brake-regulating systems or speed-regulating systems. Since such hydraulic assemblies are sufficiently known from the prior art, they will not be described in greater detail here.

Actuation of the brake pedal 1 produces a signal from brake light switch 15, which electrically controls brake lights 17 and 18 through a control device 16. When the brake pedal 1 is actuated, brake lights 17 and 18 are activated in order to show the following traffic a braking process in the leading vehicle.

Hydraulic assembly 10 comprises a control unit 20 that determines the operation of the hydraulic assembly 10. Control unit 20 obtains and processes rpm signals from wheel rpm sensors 22, 23, 24, and 25. In addition, additional driving parameters (not shown) are supplied and processed in the control unit.

During an active braking intervention that is not initiated by the driver manually operating the brake pedal 1, but by an active braking system 19, such as a vehicle spacing regulator, control unit 20 delivers a corresponding command to hydraulic assembly 10. Hydraulic assembly 10 draws brake fluid out of a compensating container 21 through the tandem main brake cylinder 3 and develops the necessary brake pressure in the wheel brakes 11, 12, 13, and 14. When an automatic braking intervention is used in a vehicle spacing regulator, the actual deceleration is built up to a specific deceleration value. The vehicle actual deceleration can be derived from the signals of wheel rpm sensors 22, 23, 24, and 25.

The wheel braking pressure to be established is built up from the control times of the valves (not shown) installed in the hydraulic assembly and a delivery pump (likewise not shown), by means of a hydraulic model. The estimate takes place in the control unit 20.

Alternatively, of course, pressure sensors can be used between hydraulic assembly 10 and wheel brakes 11–14 with the estimated pressure being replaced by the actual pressure.

Control unit 20 is connected according to the invention with control device 16 and operates it to activate or deactivate the brake lights 17 and 18 when necessary according to certain criteria. Thus, the control of brake lights 17 and 18 is triggered by control unit 20 so that a braking regulation intervention can be displayed to following traffic.

The control of brake lights 17 and 18, of course, should take place in such a way that it appears plausible to following traffic. Therefore, suitable criteria are advantageously established at which activation or deactivation of the brake lights is performed.

In this case, the brake lights 17 and 18 are activated by control unit 20 of hydraulic assembly 10 when active pressure development in the hydraulic assembly is performed for the first time. The activation of the hydraulic assembly 10 is known to the control unit 20 since it is produced by unit 20 itself. Secondly, the vehicle's actual deceleration must be above a certain deceleration threshold, in other words a deceleration at a certain level must be present. Thirdly, the pressure in the wheel brakes must also exceed a specific pressure threshold of 2 bars for example. Brake lights 17 and 18 are activated through control device 16 by control unit 20 only when all three of these requirements have been met. Of course, the criteria can also be selected differently if it is advantageous to do so.

Deactivation of brake lights 17 and 18 takes place when: (1) the active pressure development in the hydraulic assembly 10 is terminated, (2) the vehicle actual deceleration falls below a certain second threshold value, or (3) the hydraulic braking pressure falls below a certain second braking threshold. The deceleration threshold values and pressure threshold values during activation and deactivation of brake lights 17 and 18 can be chosen to be different. By selecting such a control hysteresis, the tendency of brake lights 17 and 18 to flicker can be prevented.

Figure 2:
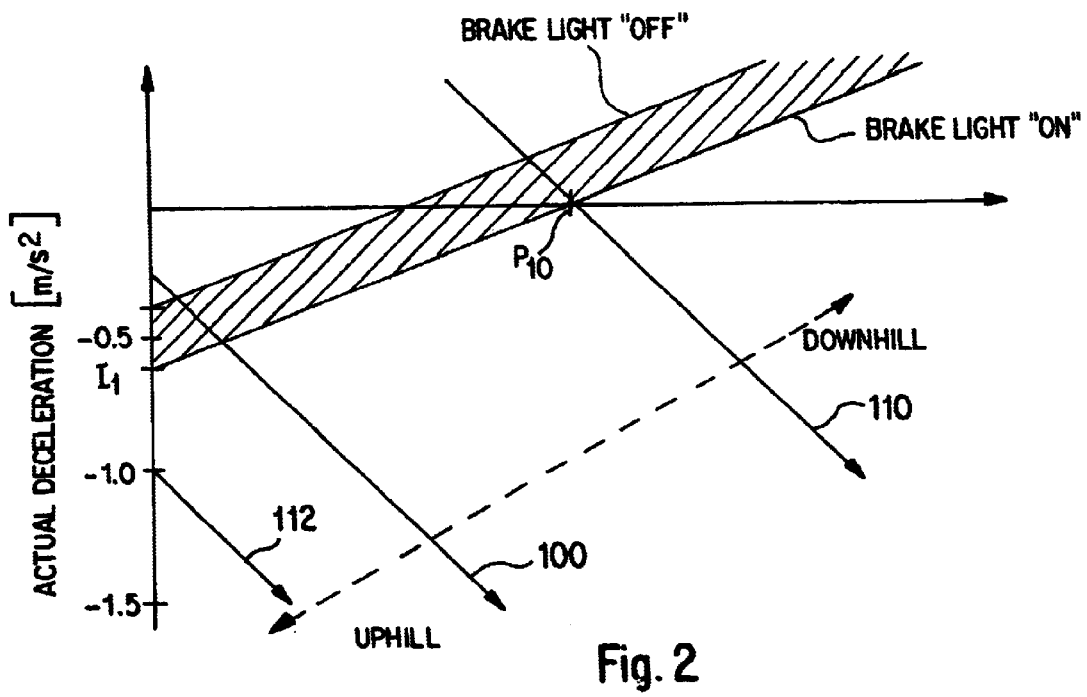
FIG. 2 is a graph of the actual deceleration versus set pressure from which a criterion for activation and deactivation of the brake light is clearly illustrated.

FIG. 2 illustrates in greater detail the criteria for delay thresholds used in turning-on and turning-off the brake lights. In the graph in FIG. 2, a specified pressure is plotted on the abscissa and the actual deceleration on the ordinate. The specified pressure indicates which braking pressure must be developed in order to achieve a certain specified deceleration. The line marked 100 shows the curve which results when a vehicle is moving essentially on level ground. To achieve a certain actual deceleration value, a certain specified pressure must be used.

Depending on whether one is going uphill or downhill, a different specified or braking pressure must be developed for equal deceleration. A corresponding street slope (or grade) displaces curve 100 "uphill" or "downhill" as illustrated by the double arrow formed by the dashed lines. Line 112 represents a curve having an actual deceleration relative to the specified pressure at a certain slope. Reference line 110 represents a curve having an actual deceleration with a certain specified pressure at a street slope of 10%. The curve marked 110 intersects the abscissa at a specified pressure $P_{10}$. This specified pressure indicates the brake pressure that must be used by a vehicle moving on a descending road with a 10% grade in order to achieve a constant vehicle speed (vehicle deceleration =0 m/sec$^2$).

The intersection of curve 100 with the ordinate gives the actual deceleration of the vehicle when no braking pressure is used. This deceleration results essentially from the total frictional losses.

Figure 3:
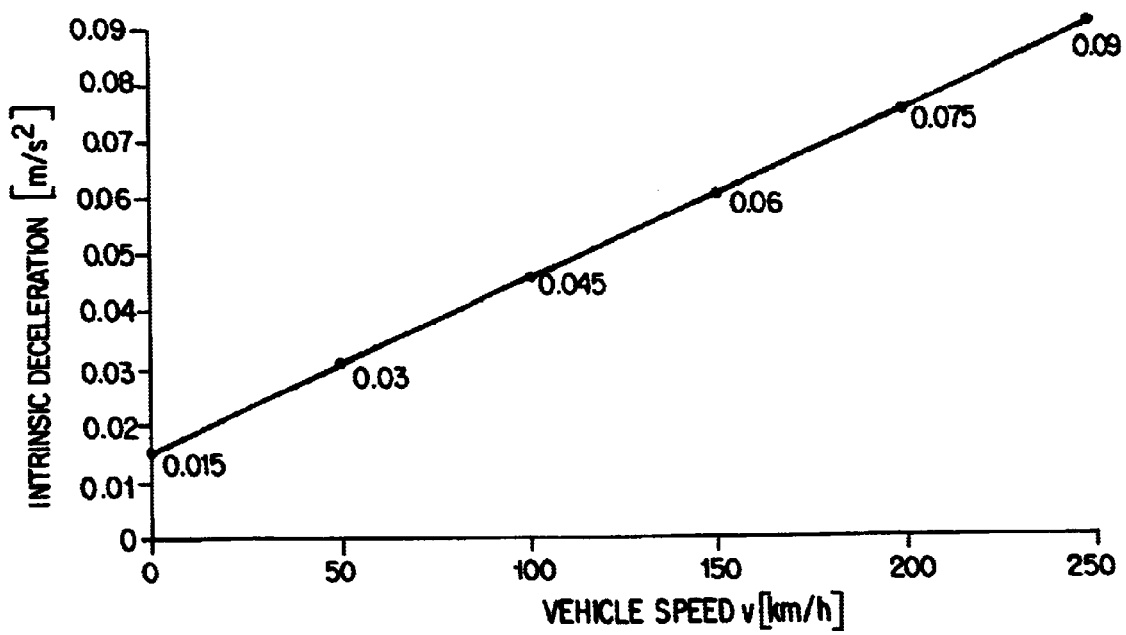
FIG. 3 is a vehicle speed-deceleration graph from which the deceleration that increases with vehicle speed can be determined.

FIG. 3 shows the speed-dependent deceleration that can increase in the higher speed range.

The vehicle deceleration threshold value at which brake lights 17 and 18 are supposed to be controlled results from the velocity-dependent deceleration plus a certain fixed offset value (I1). The vehicle deceleration boundary value increases with rising specified pressure and intersects the zero deceleration line (deceleration=0 m/sec$^2$) at a specific pressure that compensates for descent with a slope of 10%.

Set pressure $P_{10}$ is chosen so that this deceleration could also be reached by engaging a gear using the engine brake torque. In this case also, a vehicle is braked and there is no information about a braking process for the following traffic.

The deceleration threshold value "brake light off" at which brake lights 17 and 18 are deactivated is a certain amount higher than the threshold value for activation of the brake lights. The range between the two deceleration threshold values "brake light on" and "brake light off" constitutes control hysteresis that contributes to avoiding a flickering tendency.

All in all, the graph in FIG. 2 is for a certain vehicle velocity. If an operating point is below the curve "brake light on," the criterion that the vehicle deceleration exceeds a certain threshold value is fulfilled. If the operating point is above the "brake light off" curve, the criterion that the vehicle deceleration is below a certain threshold value is fulfilled.

The respective state is maintained within the hysteresis range.

The device according to the invention for controlling the brake lights can show the following traffic a plausible braking behavior even when a brake-regulating system is used. The phases "deceleration on the level," "downhill at a constant speed," and "deceleration while going downhill" are treated differently and in a suitable fashion.

The above-described control takes into account the respective traffic situation and actuates the brake lights for the following traffic. Since the deceleration threshold value according to the present embodiment decreases with increasing speed and hence with an increase in deceleration, controlling the brake lights 17 and 18 too early is avoided. In addition, the brake lights are controlled during a constant descent of a hill without deceleration only beyond a certain slope. With a slight slope without deceleration on the other hand, there is no control. This corresponds to shifting down with a manual transmission.

In addition, this conversion of brake light control takes the load state of the vehicle and the brake lining coefficient of friction into account. The coefficient of friction of the road is taken into account by additional measures. Intelligent control of the brake light is possible by comparison with a brake light switch on the brake pedal.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake light control device for a vehicle having a brake system operated by outside force actuation, comprising:
   a control unit of a brake assembly which controls brakes of the vehicle under defined vehicle operating conditions;
   a brake light switch operatively coupled with a brake operating member;
   a control device coupled to said switch and controlling an operation of at least one brake light in the vehicle upon activation of the brake light switch by the brake operating member;
   a device for determining a vehicle actual deceleration, wherein a value corresponding to the vehicle actual deceleration is supplied to said control unit from said device;
   wherein said control unit is coupled with said control device, said control unit operating said control device to control an activation of the at least one brake light under first defined vehicle operating conditions in which the vehicle actual deceleration exceeds a defined deceleration threshold value and a deactivation of the at least one brake light under second defined vehicle operating conditions, said activation and deactivation occurring even without operation of the brake light switch.

2. The brake light control device according to claim 1, wherein said device comprises at least one wheel rpm sensor, said sensor determining the vehicle actual deceleration.

3. A control system for a vehicle brake light, comprising:
   a brake system comprised of a hydraulic assembly and including a hydraulic pressure determining device;
   a control unit coupled with the hydraulic assembly for controlling brakes of the vehicle under defined vehicle operating conditions;
   a brake light switch operatively coupled with a brake operating member;
   a control device coupled to said switch and controlling an operation of at least one brake light in the vehicle upon activation of the brake light switch by the brake operating member;
   a vehicle actual deceleration device for determining an actual vehicle deceleration and supplying said actual vehicle deceleration as a signal to said control unit;
   wherein said control unit is coupled with said control device, said control unit operating said control device to control an activation of the at least one brake light under first defined vehicle operating conditions in which the actual vehicle deceleration exceeds a defined deceleration threshold value and a deactivation of the at least one brake light under second defined vehicle operating conditions, said activation and deactivation occurring even without operation of the brake light switch.

4. The control system according to claim 3, wherein said hydraulic pressure determining device is a processor that estimates hydraulic pressure based on control times of valves installed in the hydraulic assembly and a recycling pump based on a model.

5. The control system according to claim 4, wherein the first defined vehicle operating conditions additionally comprise at least one of the following:
   (1) a determination of an active pressure buildup in the hydraulic assembly; and
   (2) an exceeding of a first hydraulic boundary pressure.

6. The control system according to claim 4, wherein the second defined vehicle operating conditions include one of the following:
   (1) a determination of a termination of an active pressure build-up in the hydraulic assembly;

(2) an undershooting of a specific second vehicle deceleration limiting value; or (3) an undershooting of a second hydraulic boundary pressure.

7. The control system according to claim 3, wherein said hydraulic pressure determining device is at least one pressure sensor arranged between the hydraulic assembly and the vehicle brakes.

8. The control system according to claim 7, wherein the first defined vehicle operating conditions additionally comprise at least one of the following:

(1) a determination of an active pressure buildup in the hydraulic assembly; and (2) an exceeding of a first hydraulic boundary pressure.

9. The control system according to claim 7, wherein the second defined vehicle operating conditions include one of the following:

(1) a determination of a termination of an active pressure build-up in the hydraulic assembly;

(2) an undershooting of a specific second vehicle deceleration limiting value; or (3) an undershooting of a second hydraulic boundary pressure.

10. The control system according to claim 3, wherein the first defined vehicle operating conditions additionally comprise at least one of the following:

(1) a determination of an active pressure buildup in the hydraulic assembly; and (2) an exceeding of a first hydraulic boundary pressure.

11. The control system according to claim 10, wherein the second defined vehicle operating conditions include one of the following:

(1) a determination of a termination of an active pressure build-up in the hydraulic assembly;

(2) an undershooting of a specific second vehicle deceleration threshold value; or (3) an undershooting of a second hydraulic boundary pressure.

12. The control system according to claim 11, wherein said first and second vehicle deceleration threshold values differ from one another by an offset amount.

13. The control system according to claim 11, wherein the first specific vehicle deceleration threshold value at a hydraulic pressure of zero bars is composed of a velocity-dependent deceleration and a defined offset value.

14. The control system according to claim 10, wherein the first specific vehicle deceleration threshold value increases with hydraulic pressure.

15. The brake light control device according to claim 14, wherein said increase in the vehicle deceleration threshold value is a linear increase.

16. The brake light control device according to claim 15, wherein said vehicle deceleration threshold value intersects a zero deceleration line at a hydraulic pressure that compensates a downhill driving force on a given slope.

17. The brake light control device according to claim 14, wherein said vehicle deceleration threshold value intersects a zero deceleration line at a hydraulic pressure that compensates a downhill driving force on a given slope.

18. The control system according to claim 3, wherein the second defined vehicle operating conditions include one of the following:

(1) a determination of a termination of an active pressure build-up in the hydraulic assembly;

(2) an undershooting of a specific second vehicle deceleration threshold value; or (3) an undershooting of a second hydraulic boundary pressure.

19. A method of controlling a vehicle brake light coupled with a vehicle brake light switch, the method comprising the acts of:

detecting an automatic active braking intervention occurring in the vehicle via a control unit coupled with a brake assembly; and automatically controlling operation of the vehicle brake light even without operating the brake light switch upon detecting the automatic active braking intervention in accordance with defined vehicle operating conditions in which an actual vehicle deceleration exceeds a defined deceleration threshold value by signalling a control device that controls the vehicle brake light, the control device being also coupled to the brake light switch to control the vehicle brake light under normal operator initiated braking.

20. The method according to claim 19, further comprising the act of:

deactivating the vehicle brake light under second defined vehicle operating conditions.

21. The method according to claim 20, wherein said brake system is a hydraulic brake system having a hydraulic assembly, the method further comprising the acts of:

additionally selecting as said vehicle operating conditions at least one of the following:

(1) an active pressure build-up in the hydraulic assembly; and (2) an exceeding of a first hydraulic pressure threshold value.

22. The method according to claim 21 further comprising the act of selecting as said second defined vehicle operating conditions one of the following:

a termination of the active pressure build-up in the hydraulic assembly;

an undershooting of a defined second vehicle deceleration threshold value; or an undershooting of a second hydraulic pressure threshold value.

* * * * *